April 30, 1929.　　　　N. A. MORRO　　　　1,711,423
HOUSING FOR ELECTRIC HEATING ELEMENTS
Filed Sept. 9, 1926
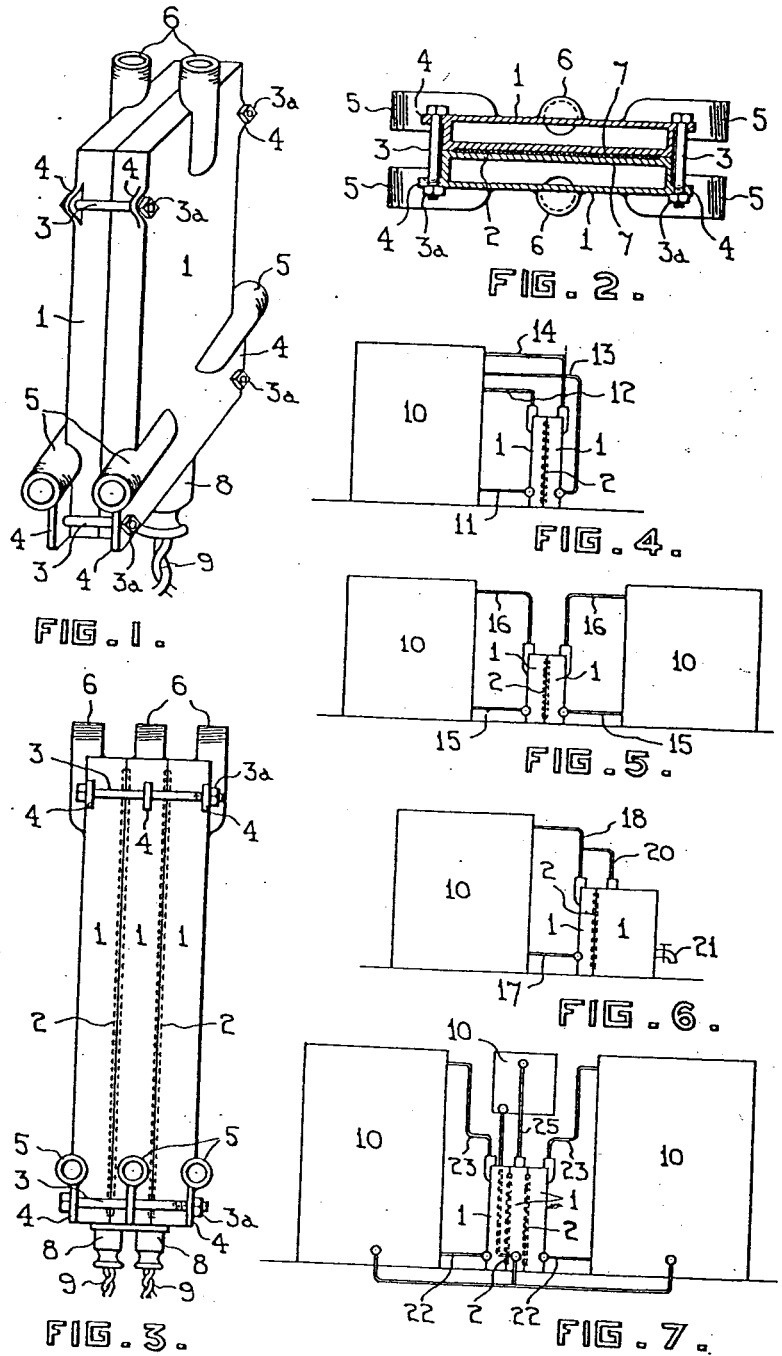
Inventor
N. A. Morro
By Langner, Parry, Card & Langner
Attys.

Patented Apr. 30, 1929.

1,711,423

UNITED STATES PATENT OFFICE.

NORMAN ANDREW MORRO, OF AUCKLAND, NEW ZEALAND.

HOUSING FOR ELECTRIC HEATING ELEMENTS.

Application filed September 9, 1926, Serial No. 134,521, and in New Zealand February 10, 1926.

This invention relates to means for housing electric elements, used for heating water for domestic uses and other purposes and has for its object the provision of an improved form of housing of a comparatively simple and inexpensive nature, whereby the elements are enabled to be effectively protected and maintained in an efficient state, and so that access can be readily gained thereto as occasion requires.

The housing provided by this invention comprises hollow members provided with inlets and outlets, for the circulation of water therethrough, and disposed to grip and retain heating elements between their adjacent faces, upon being clamped together.

The element gripping faces of the hollow members are preferably made flat, and if desired they can be recessed to accommodate the elements, lugs and clamping bolts being provided to the hollow members to enable them to be caused to grip and retain the elements.

The hollow members are connected with water storage cisterns, so as to form part of a hot water circulating system.

The invention will be further described with the aid of the accompanying drawing wherein:—

Figure 1 is a perspective view of a complete housing, and

Figure 2 is a sectional plan view thereof, while,

Figure 3 is an elevation of a housing adapted for more than a single heating element, and Figures 4, 5, 6 and 7, are diagrammatic views illustrating the disposition and connection of the hollow members, comprising the housing, in relation to and with water storage cisterns forming part of hot water circulating systems.

Referring to Figures 1 and 2 of the drawing, 1 represents hollow members between which a heating element 2 is gripped and retained, upon said members 1 being drawn or clamped together by means of bolts 3 passed through the lugs 4, and nuts 3ª placed on said bolts.

Each hollow member 1 has a pair of water inlets 5, either of which can be used, as desired, the inlet 5 not in use being plugged, while an outlet 6 provides for the exit of heated water from each hollow member 1.

Preferably the faces 7 of the hollow members 1, between which the element 2 is gripped and retained, are made flat, and if desired they can be recessed (Figure 2) to accommodate the elements.

Any desired number of hollow members 1 can be clamped together as above described, with an element 2 gripped and retained between each pair of adjacent faces 7, of said members 1.

The elements 2 used comprise strips of mica, wound with nichrome resistance ribbon, or any other suitable form of known element can be employed. A vulcanite or any insulating and heat resisting material outlet fitting 8 is detachably fitted to each pair of hollow members 1, wires 9 for conveying electric current to the elements 2 leading into said fitting 8.

A housing comprising a pair of hollow members 1 with a heating element gripped and retained between them can be connected with a water storage cistern 10 as in Figure 4, one of said hollow members 1, being connected with the cistern by means of flow and return connections 12, 11 respectively, to and from the lower portion of the cistern, so as to heat the water in the lower portion thereof, while the other hollow member 1 is connected with the upper portion of the cistern by pipes 13 and 14, so as to heat the water in the upper portion of said cistern.

With the arrangement just described the water in the top of the cistern 10 is enabled to be heated quickly, to give a supply of hot and not merely warm water, shortly after putting the apparatus into use.

In the arrangement shown in Figure 5, each hollow member 1, is connected by pipes 15 and 16, with a separate cistern 10.

If desired one of the hollow members 1 can be connected with the cistern 10 by pipes 17 and 18 (Figure 6) the other member 1 being enlarged and receiving water through the pipe 20 which does not pass to the cylinder 10, but is connected to the flow pipe 18 from the other hollow member 1 to the cistern 10.

With the arrangement shown in Figure 6, the water in the enlarged hollow member 1 although being heated is prevented from ascending through the pipe 20 until such time as it is boiling, with the result that a supply of very hot water, can be obtained from the enlarged hollow member 1 through the cock 21 in a comparatively short space of time, owing to the smaller body of water to be heated.

In the arrangement shown in Figure 7, the two outer hollow members 1, are connected by flow and return pipes 23, 22 with separate cisterns 10, while the intermediate hollow member 1, is connected by flow and return pipes 25, 24 with a further cistern 10 and owing to it having a heating element 2, located at each side thereof, the water in said intermediate member 1 is quickly heated to the required degree, as compared with the slower heating of the water in the outer members 1, having elements 2, at one side only.

Elements 2 gripped and housed between hollow members through which water circulates as described, are at all times effectively protected and retained in proper working order.

The elements being located outside the cisterns and owing to their being simply gripped between the members 1, are enabled to be readily got at for inspection and other purposes.

What I do claim and desire to obtain by Letters Patent of the United States of America is:—

In electric water-heating apparatus, counterpart, hollow water chambers closed on all sides and disposed in contact with each other at their relatively inner faces, means holding the chambers assembled, each chamber having a cold water inlet near its lower end and a hot water outlet near its upper end, the said inner faces of the chambers having mating recesses completely closed to the atmosphere through the mutual contact of their said inner faces at the marginal portions of said faces, an electrical resistance unit confined within the mating recesses in contact with the walls of said recesses, and fittings at the lower ends of the chambers for the reception of the ends of electric conductors for supplying current to the resistance unit.

In testimony whereof I have signed my name to this specification.

NORMAN A. MORRO.